March 18, 1947.　　　D. A. SEAVER　　　2,417,799
GLAND NUT
Filed Oct. 25, 1945
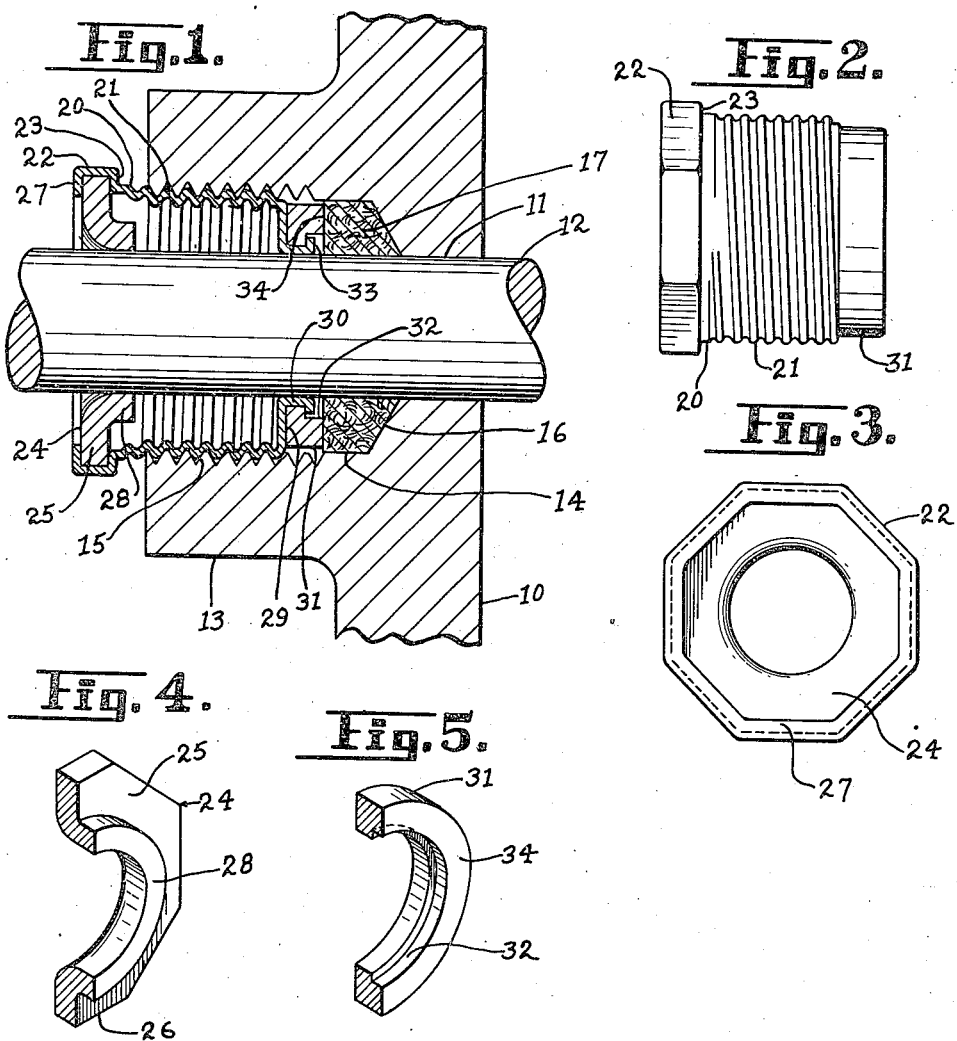
INVENTOR.
Donald A. Seaver
BY
H. F. Johnston Patented Mar. 18, 1947

2,417,799

UNITED STATES PATENT OFFICE 2,417,799

GLAND NUT

Donald A. Seaver, West Cheshire, Conn., assignor to Scovill Manufacturing Company, Waterbury, Conn., a corporation of Connecticut Application October 25, 1945, Serial No. 624,521

5 Claims. (Cl. 286—35)

This invention relates to a gland nut for stuffing boxes and of particular use wherein the packing material is to be compressed about a rod, cable or other member passing through a support to effect a water-tight seal as between such members.

It is one of the objects of this invention to provide a gland nut in which the main body portion is made from relatively thin sheet material, and wherein the threaded portion of the nut is in the form of a rolled thread. Heretofore, it has been customary in such gland nuts, even when sheet metal had been used, to have the metal of such thickness as to take a cut thread, whereas the design of this gland nut is such that the major portion can be made of relatively thin metal into which a rolled thread can be pressed, and the body part proper is reinforced by other members sufficient to bear the stresses and strains to which such nuts are subjected to when being applied and when in use.

A further object of this invention is to provide relatively heavy reinforcing members to the opposite ends of the main sheet metal nut part and wherein these reinforced members make a two point contact with the rod or cable with which it is to be associated in its application in a stuffing box. Furthermore, one of the reinforcing members and specifically the one at the inner end serves as a swivel washer to engage against the packing material in a non-rotatable manner coincident with the assembly of the nut into a stuffing box.

The full nature of this invention, along with other objects and various advantages thereof, will be more apparent from a consideration of the following description when read in connection with the accompanying drawing, in which—

Fig. 1 is a longitudinal sectional view through a stuffing box and gland nut with a portion of the cable or rod in sealed position.

Fig. 2 is a side elevational view of the gland nut, per se.

Fig. 3 is an end view of the nut as it appears from the left end of Fig. 2.

Fig. 4 is a sectional perspective view of the nut head reinforcing member, and

Fig. 5 is a sectional perspective view of the inner reinforcing and swivel washer member.

It has been customary in the past to make gland nuts of relatively heavy material and frequently they are made as a screw machine product, which requires that the initial structure be of solid rod material which necessitates a considerable amount of machining and scrap loss to provide a packing gland nut within specified dimensions.

Referring now to the drawing wherein like numerals designate like parts throughout the several views, the numeral 10 designates a supporting member having an opening 11 through which a cable or rod member 12 is adapted to pass for relative axial movement therethrough. To make provision for a suitable stuffing box to prevent leakage around the opening 11 through which the cable passes, the support 10 may either have an embossed section 13 formed as an integral part of the support member, as shown in Fig. 1, or it may be a separate member suitably secured to the support as by a welding operation. The embossed section is provided with an enlarged socket opening 14 coaxial with opening 11 and the major portion of which is threaded as at 15. The base end of the socket opening 14 is of conical shape as at 16 which serves to crowd a packing material 17 around the surface of the rod or cable member 12 for effecting a seal therebetween, and particularly the opening in the support through which the cable passes.

Up to the present point the description is more or less conventional for the general run of stuffing boxes and forms no part of the present invention except as much as it may be used in conjunction with the particular type of gland nut that is now described.

The gland nut comprises essentially a more or less cylindrical body member 20 having a roll threaded portion 21 complementary to the threads 15 in the socket opening 14. The outer end of the body member 20 is enlarged into a polygonal shaped portion 22 constituting the head of the nut and providing for a shoulder 23 as between the head and the body. The head of the nut, as shown in Fig. 3, is of octagonal shape, the head being of such shape to accommodate any wrench member for the purpose of tightening up on the gland nut and for compressing the packing material 17 in the base of the stuffing box socket 14.

In order to reinforce the head of the gland nut a relatively heavy bearing member 24 is provided having a flange 25 whose peripheral edge 26 is of polygonal shape complementary to the body head 22 and is fitted snugly there in place. The flange 25 is seated against the shoulder 23 as a stop and the bearing member 24 may be permanently held in place as by forming over the end of the head 22 as at 27. The bearing member, while of relatively heavy material, still is of a character so that it may be formed to provide a concentric hub portion 28 that surrounds the cable or rod 12 as a supporting bearing and permit relative sliding movement.

The inner or opposite end of the body portion 20 is provided with an inwardly directed base 29 terminating in a tubular neck portion 30 of a size to fit about the cable 12. To reinforce this end of the nut a relatively heavy annular washer member 31 is provided having a countersunk recess 32 in its outer face within which the end of the neck portion 30 is adapted to be spun outwardly as at 33 in order to retain the bearing washer as a permanent part of the gland nut, it being understood, however, that the spun over portion 33 is of a character to allow the bearing washer 31 to swivel relative to the nut. It is to be noted that the spun over portion is removed an appreciable distance from the outer face 34 of the bearing washer so that the swivel action of the nut relative to the washer will transmit very little, if any, of a torsional force upon the packing material 17 when the gland nut is being threaded into the socket 14. The face 34 of the washer serves to bear against the adjacent face of the packing material 17, and the frictional factor between the packing material and said washer is sufficient to maintain the washer against rotation while the swivel nut member is turned to compress said packing material within its respective socket for the purpose as hereinbefore described.

It is to be noted that the packing gland nut as a unit has two spaced bearing portions against the cable 12, one as provided for by the bearing member 24 and the other by the reduced tubular neck portion 30 reinforced by the washer 31. These two bearing surfaces, spaced such as they are, provide for a minimum of surface contact against the rod or cable 12, and also serve to assure that the gland nut will be concentrically assembled into the threads of the open socket in the stuffing box housing or hub portion 13.

While the form of the invention herewith shown and described embraces a preferred embodiment of the same, it is to be understood that the construction may be varied as to mechanical details without departing from the spirit of the invention and the scope of what is claimed.

I claim:

1. A gland nut of the character described comprising a body shell of relatively thin sheet metal material, the major portion being provided with a rolled thread, a polygonal enlarged head at one end of said body shell, the opposite end provided with an inwardly formed base terminating in a cylindrical neck, a swivel washer member surrounding said neck, and a reinforcing member fitted into said enlarged head and having an opening of similar size to the interior diameter of the neck.

2. A gland nut of the character described comprising a body shell of relatively thin sheet metal material, the major portion being provided with a rolled thread, a polygonal enlarged head at one end of said body portion, a reinforcing member of relatively heavy sheet material fitted into said head and having a periphery complemental to the head shape, the opposite end of said shell provided with an inwardly directed base terminating in a cylindrical neck, a reinforcing annular washer member surrounding said neck, and means securing said annular washer to said neck and permitting relative rotary motion therebetween.

3. A gland nut of the character described comprising a body shell of relatively thin sheet metal material, the major portion being provided with a rolled thread, a polygonal enlarged head at one end of said body shell, a reinforcing member of relatively heavy sheet material fitted into said head and having a periphery complemental to the head shape, the opposite end of said shell provided with an inwardly directed base terminating in a cylindrical neck, a reinforcing annular washer member surrounding said neck, said washer having a countersunk recess opening to its outer face, and the terminal end of said neck formed outwardly into said countersunk recess as a means for permanently retaining said washer member upon said body shell.

4. A gland nut of the character described comprising a body shell of relatively thin sheet material and formed with an exterior thread through the major portion of its length, a polygonal enlarged head at one end of said body shell, a reinforcing member of relatively heavy sheet material having a central aperture and a peripheral surface complemental to said head and fitted there in place, the opposite end of said body shell provided with an inwardly formed base terminating in a sleeve portion, the interior diameter of said sleeve portion and the central aperture of said reinforcing member being of like size, a reinforcing annular washer surrounding said sleeve portion and bearing against said base, and means swivelly connecting said annular washer to said sleeve portion.

5. A gland nut of the character described comprising a body shell of relatively thin sheet material and formed with an exterior thread through the major portion of its length, a polygonal enlarged head at one end of said body shell, a reinforcing member of relatively heavy sheet material having a peripheral surface complemental to said head and fitted there in place, said reinforcing member provided with an inwardly directed hub portion surrounding a central opening providing a bearing surface, the opposite end of said body shell provided with an inwardly formed base terminating in a sleeve portion, the interior diameter of said sleeve portion and the central opening of said reinforcing member being of substantially equal size, a reinforcing annular washer surrouding said sleeve portion and bearing against said base, and means swivelly connecting said annular washer to said sleeve portion.

DONALD A. SEAVER.

REFERENCES CITED

The following references are of record in the file of this patent:

UNITED STATES PATENTS

| Number | Name | Date |
|---|---|---|
| 2,371,753 | Fullman | Mar. 20, 1945 |
| 2,127,611 | Mueller | Aug. 23, 1938 |

FOREIGN PATENTS

| Number | Country | Date |
|---|---|---|
| 652,934 | German | 1937 |